US00RE42137E

(19) United States
(12) Reissued Patent
Treece

(10) Patent Number: US RE42,137 E
(45) Date of Reissued Patent: *Feb. 15, 2011

(54) UNIVERSAL CEMENTING PLUG

(75) Inventor: Harold O. Treece, Duncan, OK (US)

(73) Assignee: Halliburton Energy Services Inc., Duncan, OK (US)

( * ) Notice: This patent is subject to a terminal disclaimer.

(21) Appl. No.: 11/267,892

(22) Filed: Nov. 4, 2005

Related U.S. Patent Documents

Reissue of:
(64) Patent No.: 6,196,311
Issued: Mar. 6, 2001
Appl. No.: 09/175,664
Filed: Oct. 20, 1998

(62) Division of application No. 09/970,432, filed on Oct. 3, 2001, now Pat. No. Re. 41,117.

(51) Int. Cl.
*E21B 33/16* (2006.01)

(52) U.S. Cl. ..... 166/192
(58) Field of Classification Search ..... 166/192–194, 166/289–291, 153–155, 317
See application file for complete search history.

(56) References Cited

U.S. PATENT DOCUMENTS 3,605,896 A 9/1971 Perkins
3,616,850 A 11/1971 Scott (Continued)

FOREIGN PATENT DOCUMENTS

EP 0371576 6/1990
EP 0 371 576 A1 6/1990
EP 2663678 12/1991
EP 0498990 8/1992
EP 0 498 990 A1 8/1992
EP 0 697 496 A2 2/1996
EP 0697496 2/1996
EP 0 774 564 A2 5/1997
EP 0774564 5/1997
EP 0 869 257 A2 10/1998
EP 0869257 10/1998
FR 2 663 678 A1 12/1991

OTHER PUBLICATIONS

Halliburton Sales & Service Catalog No. 44, pp. 26–30 and 48–52 (1990).
Halliburton Energy Services Drawing No. 402.15013 (Aug. 1993).

*Primary Examiner*—Christopher J. Novosad
(74) *Attorney, Agent, or Firm*—Craig W. Roddy; Haynes and Boone, LLP

(57) ABSTRACT

A cementing plug having a universal construction and improved wiping and extended wear characteristics. The cementing plug has a plug subassembly with a body member and an elastomeric jacket on the body member. The body member defines a central opening therethrough with a shoulder therein. To configure the plug as a bottom cementing plug, a shearable insert is positioned on the shoulder, and to configure the plug as a top cementing plug, a non-shearable insert is positioned on the shoulder. The shearable insert is one of a plurality of such inserts designed to shear at correspondingly different shear pressures. In a first embodiment, the shearable insert is a substantially flat disk having a uniform thickness, and in a second embodiment, the shearable insert has an outer ring portion and a relatively thin inner domed portion. Thus, a bottom plug may be pumped down a well casing with cement and a top plug thereabove so that when the bottom plug lands at the bottom of the casing, the shearable insert will shear at the predetermined pressure. The jacket has one or more wiper cups which have a conical surface extending at an acute angle with respect to a longitudinal axis of the plug, thereby providing a substantially large contact area in the well casing to improve wiping efficiency and extend life.

31 Claims, 2 Drawing Sheets

U.S. PATENT DOCUMENTS

| | | | |
|---|---|---|---|
| 3,630,281 | A | 12/1971 | Fast et al. |
| 3,768,556 | A | 10/1973 | Baker |
| 3,768,562 | A | 10/1973 | Baker |
| 3,796,260 | A | 3/1974 | Bradley |
| 3,948,322 | A | 4/1976 | Baker |
| 4,246,967 | A | 1/1981 | Harris |
| 4,246,968 | A | 1/1981 | Jessup et al. |
| 4,624,312 | A | 11/1986 | McMullin |
| 4,706,747 | A | 11/1987 | Schneider |
| 4,756,365 | A | 7/1988 | Schneider |
| 4,836,279 | A | 6/1989 | Freeman |
| 4,858,687 | A | 8/1989 | Watson et al. |
| 4,934,452 | A | 6/1990 | Bradley |
| 5,095,980 | A | 3/1992 | Watson |
| 5,226,561 | A | 7/1993 | Hamilton et al. |
| 5,242,018 | A | 9/1993 | LaFleur |
| 5,311,940 | A | 5/1994 | LaFleur |
| 5,361,835 | A | 11/1994 | LaFleur |
| 5,433,270 | A | 7/1995 | LaFleur |
| 5,435,386 | A | 7/1995 | LaFleur |
| 5,437,330 | A | 8/1995 | Gambertoglio |
| 5,533,570 | A | 7/1996 | Streich et al. |
| 5,722,491 | A | 3/1998 | Sullaway et al. |
| 5,813,457 | A | 9/1998 | Gioux et al. |
| 6,419,015 | B1 | 7/2002 | Budde et al. |

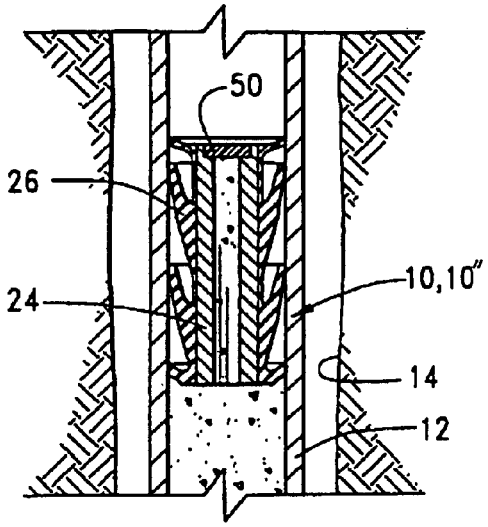
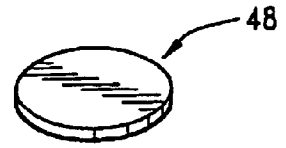
FIG. 2
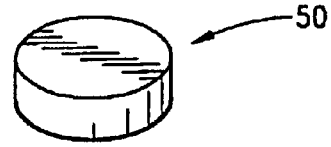
FIG. 3
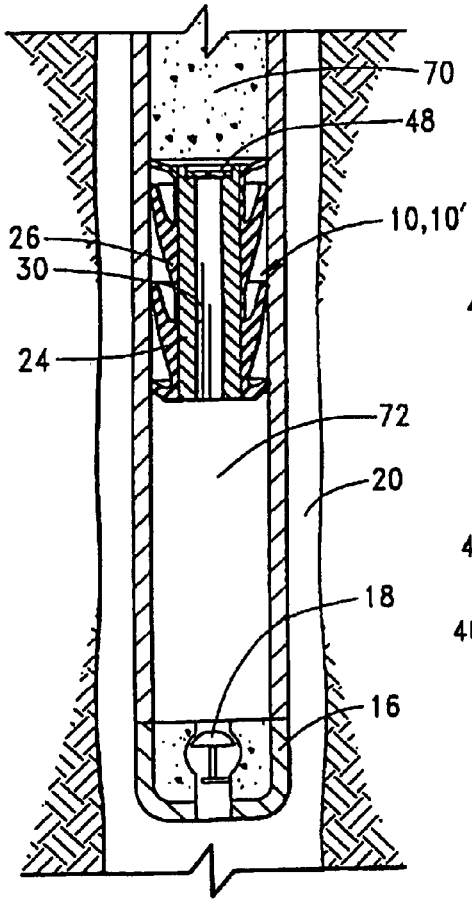
FIG. 1
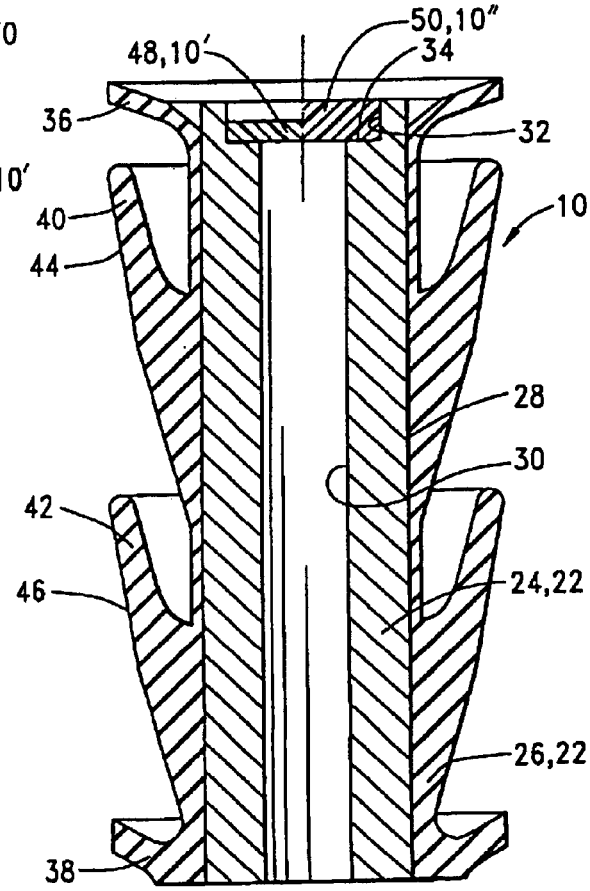
FIG. 4

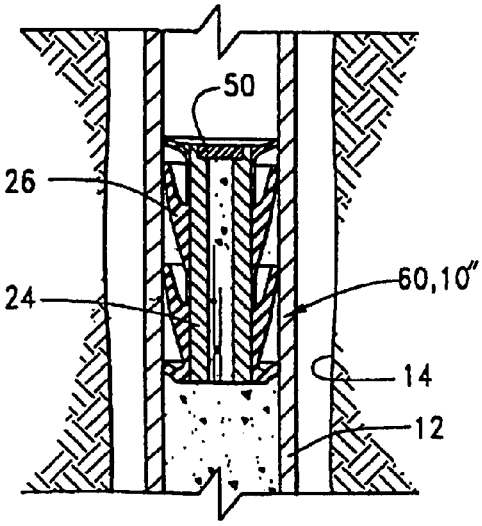
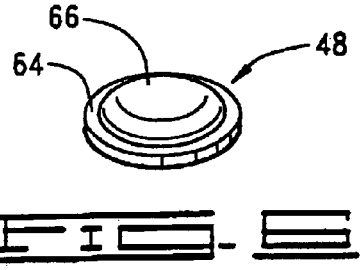
FIG. 5
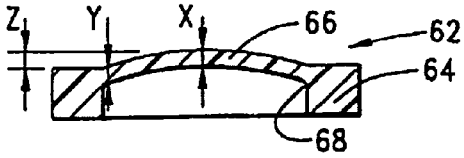
FIG. 7
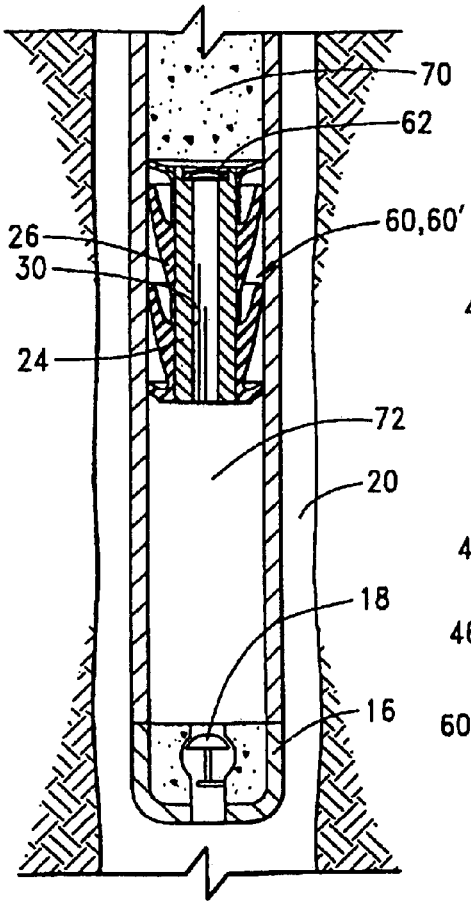
FIG. 5
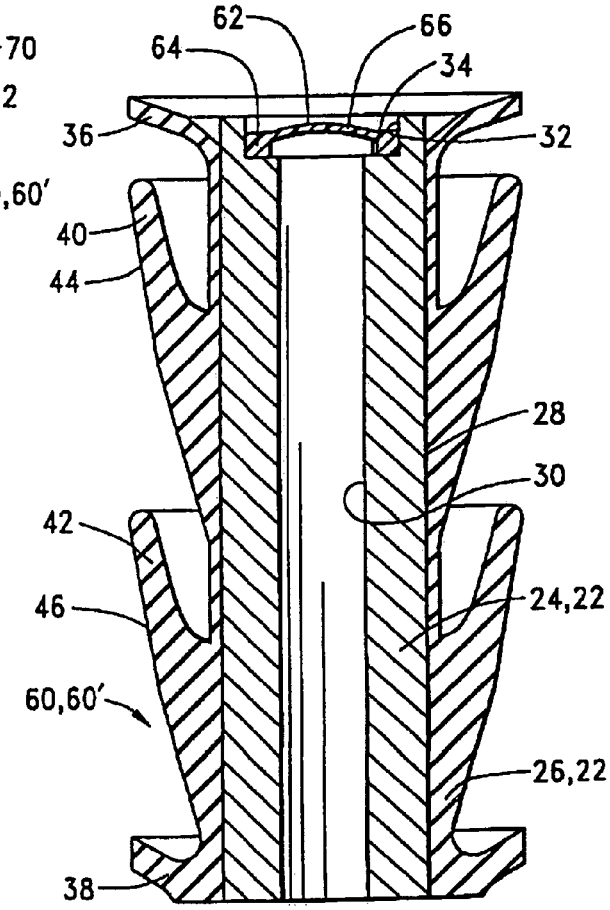
FIG. 8

UNIVERSAL CEMENTING PLUG

Matter enclosed in heavy brackets [ ] appears in the original patent but forms no part of this reissue specification; matter printed in italics indicates the additions made by reissue.

*CROSS REFERENCE*

*This application is a divisional reissue of U.S. patent application Ser. No. 09/970,432, filed Oct. 3, 2001, which is a reissue patent application of U.S. Pat. No. 6,196,311, issued Mar. 6, 2001.*

*This application also relates to U.S. patent application Ser. No. 10/307,113, filed Apr. 10, 2003, now abandoned and co-pending U.S. patent application Ser. No. 10/930,058, filed Aug. 30, 2004.*

BACKGROUND OF THE INVENTION

1. Field of the Invention

This invention relates to cementing plugs for use in cementing casing in a well, and more particularly, to a universal cementing plug having improved wiping and extended wear and which includes a plurality of interchangeable inserts so that the plug may be selectively used as a top or a bottom plug.

2. Description of the Prior Art

In the process of preparing a well for testing and/or production, a casing is positioned in the well and cemented in place. Typically, at the beginning of the cementing job in rotary-drilled wells, the casing and the wellbore are usually filled with drilling mud. In many areas, to reduce contamination on the interface between the mud and cement a bottom plug is released from a plug container and pumped ahead of the cement slurry. Such plugs have wipers of an elastomeric material thereon to wipe the casing of any accumulated mud film so that the mud is pushed ahead of the bottom plug.

When the bottom plug reaches floating equipment such as a float collar or float shoe at the bottom of the casing string, a fluid pressure differential created across the plug ruptures a rubber diaphragm at the top of the plug and allows the cement slurry to proceed down the casing through the plug and floating equipment and then up an annulus space defined between the casing and the wellbore.

When all of the cement has been mixed and pumped into the casing string, a top cementing plug is released from the plug container. The top plug also has wipers of elastomeric material thereon. The function of the top plug is to follow the cement and wipe any accumulated cement film from the inside of the casing. The top plug is also designed to reduce the possibility of any contamination or channeling of the cement slurry with the drilling mud that is used to displace the cement column down the casing and into the annular space between the casing and the wellbore. The top cementing plug is typically solid in construction, and the design is such that when it reaches the bottom cementing plug at the float collar or float shoe, the top cementing plug causes a shutoff of fluids being pumped into the casing. This causes a normal pressure rise at the surface and notifies the operator that the cementing job is complete.

The landing of the top plug lessens the possibility of any further displacement of the cement slurry and provides a better quality of cement slurry around the bottom of the casing where a good cement bond to the casing is required.

Currently, two different cementing plugs are used in this cementing operation, one for the top and one for the bottom.

The bottom plug has a shearable member, such as the rubber diaphragm previously mentioned, which shears when a specific fluid pressure differential is applied thereto. The top plug is substantially solid. Because each plug requires different construction, separate molds must be used for each of the plugs which increase the costs of manufacturing, and also, the two separate plugs must be kept in inventory. The present invention solves this problem by using a single plug subassembly design which has the same general construction whether it is used as a top plug or a bottom plug. A shearable insert is positioned in one plug so that it may be used as a bottom plug. This shearable member is designed to shear at a predetermined differential pressure thereacross. In one embodiment, the shearable member is a flat disc, and in another embodiment, the shearable member has a relatively thin domed portion. Another insert, which is essentially non-shearable at the pressures in which the plugs are utilized, is positioned in another plug so that it can be used as a top plug. By the use of a single plug subassembly, with separate inserts, the cost of molds of the plugs is decreased, and only one plug must be maintained in inventory along with the different inserts.

Another advantage of the present invention is that the shearable member may be interchanged with a plurality of shearable members, including, but not limited to, the two embodiments previously described, designed to shear at any one of a selected number of differential pressures as necessary for different well conditions. This is an improvement over the previous design which had essentially one shear pressure.

With prior art cementing plugs, the wiping efficiency of the wipers on the plugs is affected by pumping rate and wear along the casing surface. The cementing plug of the present invention provides an improved wiper design which offers more surface contact, and as the plug is pumped down the casing, wiping efficiency is increased. As a top cup on the plug wears, the pressure is transferred to a bottom cup which prolongs the surface engagement maintaining the wiping, resulting in extended wear.

SUMMARY OF THE INVENTION

The present invention is a universal cementing plug which may be configured as either a bottom cementing plug or a top cementing plug. The plug may also be described as an improved wiping and/or extended wear plug.

The cementing plug is adapted for use in cementing casing in a well and comprises a body member defining a central opening therethrough, an elastomeric jacket disposed around the body member and having a wiper cup extending therefrom for engaging an inner surface of the casing, and an insert disposed across the central opening in the body member for at least temporary closure thereof. The insert is one of a plurality of interchangeable inserts. These inserts include a shearable insert or disk adapted for shearing and thereby opening the central opening when a predetermined differential pressure is applied across the shearable insert and a substantially non-shearable insert or disk adapted for substantially permanent closure of the central opening. When the cementing plug is configured as a bottom plug, a shearable insert is used, and when the cementing plug is configured as a top plug, a non-shearable insert is used.

Each body member defines a recess adjacent to the central opening with an upwardly facing shoulder therein. When configuring the cementing plug as a bottom plug or a top plug, one of the inserts is disposed on the shoulder.

The invention may also be described as a cementing plug for use in cementing casing in a well, comprising a body member and an elastomeric jacket disposed around the body member with a wiper cup having a substantially conical outer surface thereon extending upwardly and outwardly at an acute angle with respect to a longitudinal axis of the plug. The conical surface deflects into substantially cylindrical, wiping engagement with an inner surface of the casing when the plug is disposed therein. This provides a large wiping surface for improved wiping and increased wear. Preferably, the wiper cup is one of a plurality of such wiper cups. As the upper wiper cup wears, the pressure will be gradually applied to the next lower wiper cup which continues the wiping action. This also provides extended wear life.

Stated in another way, the invention is a cementing plug apparatus for use in cementing casing in a well. The apparatus comprises a first cementing plug and a second cementing plug.

The first cementing plug comprises a first body member defining a first central opening therethrough, a first jacket disposed on the first body member, and a replaceable first disk disposed adjacent to the first body member for temporarily closing the first central opening and subsequently shearing when subjected to a predetermined pressure, thereby opening the first central opening. The first jacket has a wiper cup extending therefrom adapted for wiping engagement with an inner surface of the casing.

The second cementing plug comprises a second body member defining a second central opening therethrough, a second jacket disposed on the second body member, and a replaceable second disk disposed adjacent to the second body member for substantially permanently closing the second central opening. The second jacket has a wiper cup extending therefrom adapted for wiping engagement with an inner surface of the casing.

In the preferred embodiment, the first and second body members are substantially identical, and the first and second jackets are substantially identical. The first and second disks are interchangeable. The first disk is a selected one of a plurality of disks which are shearable at a corresponding plurality of predetermined pressures.

Also in the preferred embodiment, the first body member defines a first shoulder therein, and the second body member defines a second shoulder therein. The first disk is disposed on the first shoulder, and the second disk is disposed on the second shoulder.

Numerous objects and advantages of the invention will become apparent as the following detailed description of the preferred embodiments is read in conjunction with the drawings which illustrate such embodiments.

BRIEF DESCRIPTION OF THE DRAWINGS

FIG. 1 shows a first embodiment of the universal cementing plug and system of the present invention in use in a wellbore.

FIG. 2 is a perspective illustrating a first embodiment of a shearable insert used in the cementing plug as a bottom plug.

FIG. 3 illustrates in perspective a substantially non-shearable insert for use in the cementing plug as a top plug.

FIG. 4 illustrates a longitudinal cross section of the cementing plug of FIGS. 1–3.

FIG. 5 shows a second embodiment of the universal cementing plug and system of the present invention in use in a wellbore.

FIG. 6 is a perspective illustrating a second embodiment of a shearable insert used in the cementing plug as a bottom plug.

FIG. 7 is a longitudinal cross section of the second embodiment shearable insert.

FIG. 8 illustrates a longitudinal cross section of the cementing plug as a bottom plug including the second embodiment shearable insert of FIGS. 6 and 7.

DESCRIPTION OF THE PREFERRED EMBODIMENTS

Referring now to the drawings, and more particularly to FIG. 1, a first embodiment of the universal cementing plug of the present invention is shown and generally designated by the numeral 10. Universal cementing plug 10 may also be referred to as an improved wiping and/or extended wear cementing plug. As will be further discussed herein, cementing plug 10 can be configured as a first embodiment bottom plug 10' or a top plug 10". Bottom plug 10' and top plug 10" may be referred to together as a first embodiment cementing plug system.

Cementing plug 10 is designed for use in a casing 12 disposed in a wellbore 14. At the lower end of casing 12 is floating equipment, such as a casing float collar or float shoe 16, of a kind known in the art, having a valve 18 therein designed to allow cement to be pumped into an annulus 20 between casing 12 and wellbore 14 while preventing backflow.

Referring now to FIGS. 2–3, the details of first embodiment cementing plug 10 will be discussed. Cementing plug 10 includes a plug subassembly 22 which comprises a body member 24 and a jacket 26 disposed around the body member. Body member 24 is made of any one of a number of drillable materials known in the art, such as aluminum, plastic, wood, etc. Jacket 26 is made of an elastomeric material and is molded onto the outer surface of body member 24.

Body member 24 has a substantially cylindrical configuration with an outer surface 28 and a central opening, such as a first bore 30, defined longitudinally therethrough. A larger second bore 32 is defined in the upper end of body member 24 such that an upwardly facing annular shoulder 34 is defined between first bore 30 and second bore 32. Thus, a recess is formed in the upper end of the central opening.

Jacket 26 has an upper radially outwardly extending lip 36 and a lower radially outwardly extending lip 38. Between upper lip 36 and lower lip 38 are a pair of upwardly opening cup portions 40 and 42. Cup portion 40 may be referred to as upper cup 40, and cup portion 42 may be referred to as lower cup 42. It will be seen that upper cup 40 and lower cup 42 extend upwardly and radially outwardly. As seen in FIG. 4, cups 40 and 42 extend at an acute angle with respect to a longitudinal axis of cementing plug 10, and thus are angled much more sharply with respect to body member 24 than are upper lip 36 and lower lip 38. Upper cup 40 has an acutely angled conical outer surface 44 which is deflected into substantial wiping engagement with the inner surface of casing 12 as seen in FIG. 1, and lower cup 42 has a similar acutely angled conical surface 46.

FIG. 2 illustrates a first embodiment of a shearable insert or disk 48 which is substantially flat and of uniform thickness. FIG. 3 illustrates a substantially solid, non-shearable insert or disk 50 which is also substantially flat. Either of inserts 48 and 50 may be positioned on shoulder 34 in body member 24 of first embodiment cementing plug 10. Referring to the right side of FIG. 4, non-shearable insert 50 is shown thus forming a top plug 10". In the left side of FIG. 4, first embodiment shearable insert 48 is shown, thus illustrating a first embodiment bottom plug 10'.

First embodiment shearable insert 48 is made of a material which is easily sheared or ruptured when a predetermined differential pressure is applied thereacross. One typical material is rubber, but the invention is not intended to be so limited. The thickness of shearable insert 48 may be one of a plurality of available thicknesses so that the shear pressure may be predetermined as conditions dictate.

Non-shearable insert 50 is substantially thicker than shearable insert 48 and is designed to be substantially non-shearable when normal pressures are applied thereacross. Thus, non-shearable insert 50 provides substantially permanent closure of the central opening in the corresponding body member 24.

Referring now to FIG. 5, a second embodiment of the uniform cementing plug of the present invention is shown and generally designated by the numeral 60. Universal cementing plug 60 may also be referred to as an improved wiping and/or extended-wear cementing plug. As will be further discussed herein, cementing plug 60 can be configured as a second embodiment bottom plug 60' or the same top plug 10" as in first embodiment cementing plug 10. Second embodiment bottom plug 60' and top plug 10" may be referred together as a second embodiment cementing plug system.

As with the first embodiment, second embodiment cementing plug 60 is designed for use in casing 12 disposed in wellbore 14. Again, at the lower end of casing 12 is floating equipment, such as casing float collar or float shoe 16 having valve 18 therein. An annulus 20 is formed between casing 12 and wellbore 14.

Referring now to FIGS. 6–8, the details of second embodiment cementing plug 60 will be discussed. Cementing plug 60 includes the same plug subassembly 22 used in first embodiment cementing plug 10. Therefore, the same reference numerals are used for the components of plug subassembly 22 in FIG. 8 as were used in FIG. 4 for the first embodiment. As with the first embodiment, in the second embodiment, upper lip 40 on jacket 26 has an acutely angled conical outer surface 44 which is deflected into substantial wiping engagement with the inner surface of casing 12 as seen in FIG. 5, and lower cup 42 has a similar acutely angled conical surface 46.

FIGS. 6 and 7 illustrate a second embodiment of a shearable insert or member 62. Shearable insert 62 has an outer ring portion 64 and a relatively thin inner portion 66 which acts as a rupture disk portion. In the preferred embodiment, but not by way of limitation, inner portion 66 has an outwardly convex, curvilinear configuration. Thus, inner portion 66 may also be referred to as a domed portion 66.

Domed portion 66 is integrally formed with outer ring portion 64 and extends upwardly and inwardly from the ring portion.

Domed portion 66 preferably has a variable thickness including a first thickness X at or near its center and a second thickness Y adjacent to an internal corner 68 formed on the inside between ring portion 64 and domed portion 66. In the illustrated embodiment, first thickness X is less than second thickness Y. Corner 68 is preferably radiused.

EXAMPLES

Although various materials may be used for shearable insert 62, a preferred material is 23570 glass-filled plastic from Barlow-Hunt, Inc., of Tulsa, Okla. This material has a working temperature range of room temperature to about 410° F.

The following table illustrates the pressure at which domed portion 66 shears based on different values of X and Y using this material:

| X | Y | Shear Pressure |
|---|---|---|
| 0.100° | 0.125° | 370 psi |
| 0.125° | 0.150° | 700 psi |
| 0.131°-0.135° | 0.175° | 1200 psi |

In a preferred embodiment, but not by way of limitation, the height Z of domed portion 66 above ring portion 64 is approximately equal to center thickness X of domed portion 66.

Second embodiment shearable insert 62 may be positioned on shoulder 34 in body member 24 of plug subassembly 22 to form second embodiment bottom plug 60', as seen in FIGS. 5 and 8.

In second embodiment cementing plug 60, top plug 10" used with bottom plug 60' is identical to that in first embodiment cementing plug 10.

OPERATION OF THE INVENTION

Referring again to FIGS. 1 and 5, the operation of cementing plug systems 10 and 60 are shown, respectively. First, a bottom plug 10' or 60' is prepared by positioning a shearable insert 48 or 62, respectively, in body member 24 of a plug subassembly 22, and a top plug 10" is similarly formed by positioning a non-shearable insert 50 in body member 24 of another plug subassembly 22. Bottom plug 10' or 60' is dropped into casing 12 in a manner known in the art. Cement 70 is pumped into casing 12 above bottom plug 10' or 60', thus forcing the bottom plug downwardly to displace mud and other fluid in casing volume 72 below bottom plug 10' or 60'. This mud is forced outwardly into well annulus 20 after opening of valve 18 in float shoe 16.

Once the desired amount of cement 70 is pumped into casing 12, top plug 10" is dropped into the well, and additional fluid pumped into casing 12 to force top plug 10" downwardly. The downward movement of top plug 10", forces cement 70 downwardly, and thus, bottom plug 10' or 60' is also forced downwardly until it lands on top of float shoe 16. Additional pressure applied above upper plug 10" will create a pressure differential across shearable insert 48 in bottom plug 10' or shearable insert 62 in bottom plug 60' until the insert shears. At this point, further pumping of fluid above top plug 10" will force cement downwardly through first bore 30 in body member 24 of lower plug 10' or 60' and past valve 18 in float shoe 16 so that the cement is pumped into well annulus 20. Pumping is stopped when top plug 10" lands on top of bottom plug 10' or 60', at which point all of the cement has been forced into well annulus 20. Once the cement cures, top plug 10", bottom plug 10' or 60' and float shoe 16 may be drilled out of casing 12 as desired in a manner known in the art.

The sharply angled configuration of conical surfaces 44 and 46, respectively, of upper cup 40 and lower cup 42 on jacket 26 of bottom plug 10' or 60' and top plug 10" offers more surface contact with the inside of casing 12 than previous cementing plugs. When bottom plug 10' or 60' and top plug 10" are positioned in casing 12, conical surfaces 44 and 46 are compressed such that they are in flat, substantially cylindrical contact with the inner surface of the casing. As any of plugs 10', 60' or 10" move downwardly through casing 12, the pressure above the plug is first mostly applied to upper cup 40. As conical surface 44 wears and fluid pressure leaks therepast, the pressure is then applied to lower cup 42 and conical surface 46 thereof. Cementing plug 10 or 60 can be designed with any number of cup portions as well conditions dictate.

Because of the design of new cementing plug 10 or 60, the operator of the well only has to maintain one plug subassembly 22 in inventory, along with the necessary corresponding number of shearable inserts 48 or 62 and non-shearable inserts 50. Thus, inventory control is simpler than with prior art plugs. Further, by having a plurality of different shearable plugs 48 or 62, the operator has the opportunity to select a shear pressure rather than use the single pressure previously available.

It will be seen, therefore, that the cementing plug of the present invention is well adapted to carry out the ends and advantages mentioned, as well as those inherent therein. While a preferred embodiment of the invention has been shown for the purposes of this disclosure, numerous changes in the arrangement and construction of parts may be made by those skilled in the art. All such changes are encompassed within the scope and spirit of the appended claims.

What is claimed is:

[1. A cementing plug for use in cementing casing in a well, comprising:

a body member defining a central opening therethrough;

an elastomeric jacket disposed around said body member and having a wiper cup extending therefrom for engaging an inner surface of the casing;

an insert disposed across said central opening in said body member for closure thereof, said insert being one of a plurality of interchangeable inserts; and wherein said insert is a shearable member adapted for shearing and opening said central opening when a predetermined differential pressure is applied across said shearable member or a substantially non-shearable disk adapted for substantially permanent closure of said central opening.]

[2. The plug of claim 1 wherein said shearable member is made of a rupturable material.]

[3. The plug of claim 1 wherein said shearable member is a substantially flat disk having a substantially uniform thickness.]

[4. The plug of claim 1 wherein said shearable member comprises:

a ring portion; and a domed portion extending from said ring portion.]

[5. The plug of claim 1 wherein:

said body member defines a shoulder in said central opening; and said insert is disposed on said shoulder.]

[6. The plug of claim 1 wherein said wiper cup is one of a plurality of such wiper cups.]

[7. The plug of claim 1 wherein said wiper cup has an conical outer surface extending upwardly and outwardly at an acute angle with respect to a longitudinal axis of the plug.]

[8. A cementing plug for use in a cementing casing in a well, comprising:

a body member defining a central opening therethrough and having a longitudinal axis;

an elastomeric jacket disposed around said body member and having a wiper cup extending therefrom, said wiper cup defining a conical outer surface extending upwardly and outwardly at an acute angle with respect to said longitudinal axis, wherein said outer surface is deflected into substantially cylindrical, wiping engagement with an inner surface of a casing when the plug is disposed therein;

an insert disposed in said central opening for at least temporary closure thereof, said insert being a selected one of a plurality of inserts; and wherein said insert is a shearable member adapted for shearing and opening said central opening when a predetermined differential pressure is applied across said shearable member or a substantially non-shearable disk adapted for substantially permanent closure of said central opening.]

[9. The plug of claim 8 wherein said wiper cup is one of a plurality of said wiper cups.]

[10. The plug of claim 8 wherein said insert is positioned on a shoulder defined on said body member.]

[11. A cementing plug apparatus for use in cementing a length of well casing in a well, said apparatus comprising:

a pair of substantially identical plug subassemblies, each of said plug subassemblies comprising:

a generally cylindrical body member defining a central opening longitudinally therethrough; and an outer jacket disposed around said body member, said jacket having a resilient wiper cup extending therefrom adapted for wiping engagement with an inner surface of said length of casing;

a shearable insert positionable in one of said body members for temporarily closing said central opening in said one body member and for rupturing and thereby opening said central opening in response to a predetermined differential pressure thereacross; and a substantially non-shearable insert positionable in the other of said body members for substantially permanently closing said central opening in the other body member.]

[12. The apparatus of claim 11 wherein said jacket is made of an elastomeric material.]

[13. The apparatus of claim 11 wherein said wiper cup is one of a plurality of wiper cups extending from said jacket.]

[14. The apparatus of claim 11 wherein said wiper cup has an outer surface extending upwardly and outwardly at an acute angle with respect to a longitudinal axis of the corresponding body member.]

[15. The apparatus of claim 11 wherein:

said body member has a recess defined therein adjacent to said central opening;

said shearable insert is positioned in the recess of said one of said plugs; and said non-shearable insert is positioned in the recess of the other of said plugs.]

[16. The apparatus of claim 11 wherein said shearable insert comprises:

a ring portion; and a domed portion extending upwardly and inwardly from said outer ring portion.]

[17. The apparatus of claim 11 wherein said shearable insert comprises a substantially flat disk of substantially uniform thickness.]

[18. The apparatus of claim 11 wherein said non-shearable insert comprises a substantially flat disk of substantially uniform thickness.]

[19. A cementing plug apparatus for use in cementing casing in a well, said apparatus comprising:

a first cementing plug comprising:

a first body member defining a first central opening therethrough;

a first jacket disposed on said first body member, said first jacket having a wiper cup extending therefrom adapted for wiping engagement with an inner surface of the casing; and a replaceable first insert disposed adjacent to said first body member for temporarily closing said first central opening and subsequently shearing when subjected to a predetermined pressure, thereby opening said first central opening; and a second cementing plug comprising:

a second body member defining a second central opening therethrough;

a second jacket disposed on said second body member, said second jacket having a wiper cup extending therefrom adapted for wiping engagement with an inner surface of the casing; and a replaceable second insert disposed adjacent to said second body member for substantially permanently closing said second central opening.]

[20. The apparatus of claim 19 wherein:

said first and pond body members are substantially identical; and said first and second jackets are substantially identical.]

[21. The apparatus of claim 20 wherein said second insert comprises a substantially flat disk.]

[22. The apparatus of claim 19 wherein said first and second inserts are interchangeable.]

[23. The apparatus of claim 19 wherein said first insert is a selected one of a plurality of inserts shearable at a corresponding plurality of predetermined pressures.]

[24. The apparatus of claim 23 wherein said first insert comprises a substantially flat disk.]

[25. The apparatus of claim 23 wherein said first insert comprises:

an outer ring portion; and an inner domed portion integrally formed with said outer ring portion.]

[26. The apparatus of claim 19 wherein said first and second jackets are made of an elastomeric material.]

[27. The apparatus of claim 19 wherein:

said wiper cup on said first jacket is one of a pair of wiper cups; and said second wiper cup on said second jacket is one of a pair of wiper cups.]

[28. The apparatus of claim 19 wherein said wiper cup on said first jacket and said wiper cup on said second jacket have a conical outer surface extending upwardly and outwardly at an acute angle with respect to a longitudinal axis of said first and second body members.]

[29. The apparatus of claim 28 wherein said wiper cups are made of an elastomeric material.]

[30. The apparatus of claim 19 wherein:

said first body member defines a first shoulder therein;

said second body member defines a second shoulder therein;

said first disk is disposed on said first shoulder; and said second disk is disposed on said second shoulder.]

[31. A plug for use in a well casing, comprising:

a body member defining a central opening therethrough;

a jacket disposed around said body member and having a wiper cup extending therefrom for engaging an inner surface of the casing; and an insert disposed in said central opening for at least temporary closure thereof, wherein said insert is a shearable member or a substantially non-shearable disk.]

[32. The plug of claim 31 wherein said insert is one of a plurality of shearable and non-shearable inserts.]

[33. The plug of claim 32 wherein said inserts are interchangeable.]

[34. The plug of claim 31 wherein said insert is a substantially flat disk having a substantially uniform thickness.]

[35. The plug of claim 31 wherein said shearable member is adapted for shearing and opening said central opening when a predetermined differential pressure is applied across said shearable member and said non-shearable disk is adapted for substantially permanent closure of said central opening.]

[36. The plug of claim 31 wherein said shearable member is made of a rupturable material.]

[37. The plug of claim 31 wherein said shearable member is one of a plurality of available thicknesses so that the shear pressure may be predetermined.]

[38. The plug of claim 37 wherein said ring portion and said domed portion are integrally formed.]

[39. The plug of claim 31 wherein said shearable member comprises:

a ring portion; and a domed portion extending from said ring portion.]

[40. The plug of claim 31 wherein said insert is positioned on a shoulder defined on said body member.]

[41. The plug of claim 31 wherein said jacket is made of an elastomeric material.]

[42. The plug of claim 31 wherein said wiper cup is one of a plurality of such wiper cups.]

[43. The plug of claim 31 wherein said wiper cup has an conical outer surface extending upwardly and outwardly at an acute angle with respect to a longitudinal axis of the plug.]

[44. A plug for use in a well casing, comprising:

a body member defining a central opening therethrough; and an insert positioned for at least temporary closure of said central opening, wherein said insert comprises:

an outer ring portion, and an inner portion extending from said outer ring portion, wherein said inner portion is thinner than said outer ring portion and has a variable thickness.]

[45. The plug of claim 44 wherein said outer ring portion and said inner portion are integrally formed.]

[46. The plug of claim 44 wherein said outer ring portion and said inner portion form an internal corner.]

[47. The plug of claim 46 wherein said corner is radiused.]

[48. The plug of claim 44 wherein said inner portion has a first thickness at a center thereof and a second thickness at an outer portion thereof adjacent to said outer ring portion.]

[49. The plug of claim 48 wherein said inner portion is an outwardly convex domed portion.]

[50. The plug of claim 49 wherein said domed portion has a height above said outer ring portion approximately equal to said first thickness.]

[51. The plug of claim 48 wherein said first thickness is less than said second thickness.]

*52. A method for wiping an inner surface of a tubular member comprising:*

*providing in the tubular member a plug having two conical wipers one of which overlaps the other in an axial direction, the wipers engaging the inner surface in a manner so that each wiper is deflected into a substan-*

*tially cylindrical shape in engagement with the inner surface; and applying pressure from one end of the tubular member to move the plug within the tubular member; and*

*providing an insert across a central opening in the plug for closure thereof, wherein the insert is a shearable member adapted for shearing and opening the central opening when a predetermined pressure is applied across the shearable member or a substantially non-shearable member adapted for substantially permanent closure of the central opening.*

*53. The method of claim 52 wherein the wiper closest to the one end of the tubular member is overlapped by the other wiper.*

*54. The method of claim 52 wherein as the wiper closest to the one end of the tubular member wears, the pressure will be applied to the other wiper.*

*55. The method of claim 52 further comprising:*

*providing an additional plug in the tubular member having two axially-spaced, conical wipers thereon, wherein each wiper on the additional plug engages the inner surface in a manner so that the wiper is deflected into a substantially cylindrical shape in engagement with the inner surface; and*

*applying pressure from one end of the tubular member to move the additional plug within the tubular member.*

*56. The method of claim 52 wherein the wiper closest to the one end of the tubular member is overlapped by the other wiper on each plug.*

*57. A method for wiping an inner surface of a tubular member comprising:*

*introducing a first plug into one end of the tubular member;*

*introducing a fluid into the one end of the tubular member to force the first plug downwardly in the tubular member to displace any fluid from the tubular member below the first plug;*

*providing at least two wipers on the first plug, one of the wipers overlapping the other wiper in an axial direction so that, as the plug passes downwardly in the tubular member, it wipes the inner surface of the tubular member of any accumulated fluid, wherein each wiper of the first plug is sized to engage the inner surface in a manner so that it is deflected into a substantially cylindrical wiping engagement with the inner surface;*

*terminating the step of introducing the fluid into the tubular member;*

*introducing a second plug into the tubular member end;*

*forcing the second plug downwardly through the tubular member so that it forces the fluid and the first plug downwardly in the tubular member;*

*establishing a differential pressure across the first plug to open the first plug and allow the fluid to pass through the first plug and exit the other end of the tubular member; and*

*providing at least two wipers on the second plug one of which overlaps the other in an axial direction, so that as the second plug passes downwardly in the tubular member, it wipes the inner surface of the tubular member of any accumulated fluid, wherein each wiper of the second plug is sized to engage the inner surface in a manner so that it is deflected into a substantially cylindrical wiping engagement with the inner surface.*

*58. The method of claim 57 wherein the wiper of each plug closest to the one end of the tubular member is overlapped by the other wiper of the same plug.*

*59. The method of claim 57 wherein the second plug is forced downwardly in the tubular member introducing a fluid into the tubular member.*

*60. The method of claim 57 wherein the second plug forces the fluid from the tubular member into an annulus formed between the tubular member and the well.*

*61. The method of claim 57 further comprising providing a float shoe in the tubular member which stops the downward movement of the first plug and causes the differential pressure.*

*62. A method for wiping an inner surface of a tubular member comprising:*

*introducing a first plug into one end of the tubular member;*

*introducing a fluid into the one end of the tubular member to apply pressure to the first plug to force it downwardly in the tubular member to displace any fluid in the tubular member below the first plug;*

*providing at least two wipers on the first plug, one of the wipers overlapping the other in an axial direction so that, as the first plug passes downwardly in the tubular member, it wipes the inner surface of the tubular member of any accumulated fluid, and so that, as a wiper on the first plug closest to the one end of the tubular member wears, the pressure will be applied to the other wiper of the same plug;*

*terminating the step of introducing the fluid into the tubular member;*

*introducing a second plug into the tubular member end;*

*applying pressure to the second plug to force it downwardly through the tubular member so that it forces the fluid and the first plug downwardly in the tubular member;*

*establishing a differential pressure across the first plug to open the first plug and allow the fluid to pass through the first plug and exit the other end of the tubular member; and*

*providing at least two wipers on the second plug, one the wipers overlapping the other in an axial direction so that, as the second plug passes downwardly in the tubular member, it wipes the inner surface of the tubular member of any accumulated fluid, wherein as a wiper on the second plug closest to the one end of the tubular member wears, the pressure will be applied to the other wiper of the same plug.*

*63. The method of claim 62 wherein the wiper of each plug closest to the one end of the tubular member is overlapped by the other wiper of the same plug.*

*64. The method of claim 62 wherein the first and second plugs are identical.*

*65. The method of claim 62 wherein the step of applying pressure to the second plug comprises introducing a fluid into the tubular member.*

*66. The method of claim 62 wherein the second plug forces the fluid from the tubular member into an annulus formed between the tubular member and the well.*

*67. The method of claim 62 further comprising providing a float shoe in the tubular member which stops the downward movement of the first plug and causes the differential pressure.*

*68. A method for wiping an inner surface of a tubular member comprising:*

*providing in the tubular member a plug having two axially-spaced, conical wipers that engage the inner surface in a manner so that each wiper is deflected into a substantially cylindrical shape in engagement with the inner surface;*

*applying pressure from one end of the tubular member to move the plug within the tubular member;*

*providing an additional plug in the tubular member having two axially-spaced, conical wipers that engage the inner surface in a manner so that the wiper is deflected into a substantially cylindrical shape in engagement with the inner surface;*

*applying pressure from one end of the tubular member to move the additional plug within the tubular member; and*

*providing a shearable insert across a central opening in the plug closest to the end of the tubular member for closure thereof, the insert being adapted for shearing and opening the central opening in the latter plug when a predetermined pressure is applied across the shearable insert, and further comprising providing a substantially non-shearable insert across a central opening in the other plug for substantially permanent closure of the opening in the second plug.*

*69. A method for wiping a tubular member containing fluid comprising:*

*introducing a first plug into one end of the tubular member;*

*introducing fluid into the one end of the tubular member to force the first plug downwardly in the tubular member to displace the fluid from the tubular member;*

*providing at least two axially spaced wipers on the first plug so that, as the plug passes downwardly in the tubular member, it wipes the inner surface of the tubular member of any accumulated fluid, wherein each wiper of the first plug is sized to engage the inner surface in a manner so that it is deflected into a substantially cylindrical wiping engagement with the inner surface;*

*terminating the step of introducing the fluid into the tubular member;*

*introducing a second plug into the tubular member end which is identical to the first plug;*

*forcing the second plug downwardly through the tubular member so that it forces the fluid and the first plug downwardly in the tubular member;*

*establishing a differential pressure across the first plug to open the first plug and allow the fluid to pass through the first plug and exit the other end of the tubular member; and*

*providing at least two axially spaced wipers on the second plug so that as the second plug passes downwardly in the tubular member, it wipes the inner surface of the tubular member of any accumulated fluid, wherein each wiper of the second plug is sized to engage the inner surface in a manner so that it is deflected into a substantially cylindrical wiping engagement with the inner surface.*

*70. A method for wiping a tubular member containing fluid in a well comprising:*

*introducing a first plug into one end of the tubular member;*

*introducing fluid into the one end of the tubular member to force the first plug downwardly in the tubular member to displace the fluid from the tubular member; providing at least two axially spaced wipers on the first plug so that, as the plug passes downwardly in the tubular member, it wipes the inner surface of the tubular member of any accumulated fluid, wherein each wiper of the first plug is sized to engage the inner surface in a manner so that it is deflected into a substantially cylindrical wiping engagement with the inner surface;*

*terminating the step of introducing the fluid into the tubular member;*

*introducing a second plug into the tubular member end;*

*forcing the second plug downwardly through the tubular member so that it forces the fluid and the first plug downwardly in the tubular member;*

*establishing a differential pressure across the first plug to open the first plug and allow the fluid to pass through the first plug and exit the other end of the tubular member;*

*providing at least two axially spaced wipers on the second plug so that as the second plug passes downwardly in the tubular member, it wipes the inner surface of the tubular member of any accumulated fluid, wherein each wiper of the second plug is sized to engage the inner surface in a manner so that it is deflected into a substantially cylindrical wiping engagement with the inner surface; and*

*providing a shearable insert across a central opening in the first plug for closure thereof and adapted for shearing and opening the central opening in the first plug when a predetermined pressure is applied across the shearable insert, and further comprising providing a substantially non-shearable insert across a central opening in the second plug for substantially permanent closure of the opening in the second plug.*

*71. A method for wiping a tubular member containing fluid comprising:*

*introducing a first plug into one end of the tubular member;*

*introducing fluid into the one end of the tubular member to apply pressure to the first plug to force it downwardly in the tubular member to displace the fluid from the tubular member;*

*providing at least two axially spaced wipers on the first plug so that, as the first plug passes downwardly in the tubular member, it wipes the inner surface of the tubular member of any accumulated fluid, wherein as a wiper on the first plug closest to the one end of the tubular member wears, the pressure will be applied to the other wiper of the first plug;*

*terminating the step of introducing the fluid into the tubular member;*

*introducing a second plug into the tubular member end;*

*applying pressure to the second plug to force it downwardly through the tubular member so that it forces the fluid and the first plug downwardly in the tubular member;*

*establishing a differential pressure across the first plug to open the first plug and allow the fluid to pass through the first plug and exit the other end of the tubular member;*

*providing at least two axially spaced wipers on the second plug so that, as the second plug passes downwardly in the tubular member, it wipes the inner surface of the tubular member of any accumulated fluid, wherein as a wiper on the second plug closest to the one end of the tubular member wears, the pressure will be applied to the other wiper of the second plug; and*

*sizing each wiper to engage the inner surface in a manner so that it is deflected into a substantially cylindrical wiping engagement with the inner surface.*

*72. A method for wiping a tubular member containing fluid in a well comprising:*

*introducing a first plug into one end of the tubular member;*

*introducing fluid into the one end of the tubular member to apply pressure to the first plug to force it downwardly in the tubular member to displace the fluid from the tubular member;*

*providing at least two axially spaced wipers on the first plug so that, as the first plug passes downwardly in the tubular member, it wipes the inner surface of the tubular member of any accumulated fluid, wherein as a wiper on the first plug closest to the one end of the tubular member wears, the pressure will be applied to the other wiper of the first plug;*

*terminating the step of introducing the fluid into the tubular member;*

*introducing a second plug into the tubular member end;*

*applying pressure to the second plug to force it downwardly through the tubular member so that it forces the fluid and the first plug downwardly in the tubular member;*

*establishing a differential pressure across the first plug to open the first plug and allow the fluid to pass through the first plug and exit the other end of the tubular member;*

*providing at least two axially spaced wipers on the second plug so that, as the second plug passes downwardly in the tubular member, it wipes the inner surface of the tubular member of any accumulated fluid, wherein as a wiper on the second plug closest to the one end of the tubular member wears, the pressure will be applied to the other wiper of the second plug; and*

*providing a shearable insert across a central opening in the first plug for closure thereof and adapted for shearing and opening the central opening in the first plug when a predetermined pressure is applied across the shearable insert, and further comprising*

*providing a substantially non-shearable insert across a central opening in the second plug for substantially permanent closure of the opening in the second plug.*

*73. A plug for wiping an inner surface of a tubular member, the plug comprising:*

*a body member;*

*a lip extending outwardly from the body member and defining a wiping surface for wiping the inner surface of the tubular member; and*

*at least two axially spaced wiper cups having a conical outer surface extending outwardly around the body member and defining a wiping surface for wiping the inner surface of the tubular member, wherein the length of the wiping surface of each of the wiper cups is greater than the length of the wiping surface of the lip.*

*74. The plug of claim 73 wherein the axial length of the wiping surface of each of the wiper cups is up to approximately five times greater than the axial wiping surface of the lip.*

*75. A plug for wiping an inner surface of a tubular member, the plug comprising:*

*a body member;*

*a lip extending outwardly from the body member and defining a wiping surface for wiping the inner surface of the tubular member; and*

*at least two axially spaced wiper cups extending outwardly from the body member and defining a wiping surface for wiping the inner surface of the tubular member;*

*wherein the axial length of the wiping surface of each of the wiper cups is greater than the maximum radial width of the lip; and*

*wherein each of the wiper cups is deflected into a substantially cylindrical shape in engagement with the inner surface.*

*76. The plug according to claim 75 wherein the body member has a central opening.*

*77. The plug of claim 75 wherein each of the wiper cups extends radially outwardly from the body member at an acute angle with respect to the longitudinal axis of the body member.*

*78. The plug of claim 75 further comprising a jacket disposed around the body member wherein the at least two axially spaced wiper cups are integrally formed with the jacket.*

*79. The plug of claim 75 further comprising an insert disposed across a central opening in the body member for closure thereof, wherein said insert is a shearable member adapted for shearing and opening the central opening when a predetermined pressure is applied across the shearable member or a substantially non-shearable member adapted for substantially permanent closure of the central opening.*

*80. The plug of claim 75 wherein one of the at least two axially spaced wiper cups overlaps the other wiper cup in an axial direction so that the outer surfaces of the wiper portions together extend continuously along the longitudinal axis of the body member before the plug is inserted in the tubular member.*

*81. A method of wiping comprising:*

*introducing fluid into a tubular member; and*

*moving a plug in the tubular member to move the fluid wherein the plug is constructed in accordance with claim 75.*

*82. A method of wiping fluid from a tubular member:*

*introducing fluid into a tubular member;*

*providing a plug having a body member, a lip and at least two axially spaced wiper cups having a conical outer surface, wherein each wiper cup defines a wiping surface for wiping an inner surface of the tubular member, wherein:*

*(a) the length of the wiping surface of each of the wiper cups is greater than the length of the wiping surface of the lip, or*

*(b) the axial length of the wiping surface of each of the wiper cups is greater than the maximum radial width of the lip; and*

*moving the plug in the tubular member to wipe the fluid.*

* * * * *